United States Patent [19]
Jenkins et al.

[11] Patent Number: 5,176,108
[45] Date of Patent: * Jan. 5, 1993

[54] BORON-BASED ODOR CONTROL ANIMAL LITTER

[75] Inventors: Dennis B. Jenkins, Livermore; Randy L. Wood, Dublin, both of Calif.

[73] Assignee: The Clorox Company, Oakland, Calif.

[*] Notice: The portion of the term of this patent subsequent to Aug. 21, 2007 has been disclaimed.

[21] Appl. No.: 569,098

[22] Filed: Aug. 17, 1990

Related U.S. Application Data

[63] Continuation-in-part of Ser. No. 208,953, Jun. 17, 1988, Pat. No. 4,949,672.

[51] Int. Cl.$^5$ ............................................. A01K 1/015
[52] U.S. Cl. ................................................... 119/173
[58] Field of Search ........................... 119/171, 172, 173

[56] References Cited

U.S. PATENT DOCUMENTS

| | | | |
|---|---|---|---|
| 2,895,873 | 7/1959 | Sawyer et al. | 167/42 |
| 3,029,783 | 4/1962 | Sawyer et al. | 119/1 |
| 3,059,615 | 10/1962 | Kuceski et al. | 119/1 |
| 3,352,792 | 11/1967 | Clark et al. | 252/193 |
| 3,388,989 | 6/1968 | Sor | 71/28 |
| 3,523,018 | 8/1970 | Geissler et al. | 71/28 |
| 3,565,599 | 2/1971 | Sor et al. | 71/28 |
| 3,765,371 | 10/1973 | Fisher | 119/1 |
| 3,883,303 | 5/1975 | Roberts | 21/55 |
| 3,892,846 | 7/1975 | Wortham | 424/76 |
| 3,923,005 | 12/1975 | Fry | 119/1 |
| 4,054,518 | 10/1977 | Gould | 210/61 |
| 4,217,858 | 8/1980 | Dantoni | 119/1 |
| 4,263,873 | 4/1981 | Christianson | 119/172 |
| 4,306,516 | 12/1981 | Currey | 119/1 |
| 4,407,231 | 10/1983 | Colborn | 119/1 |
| 4,462,819 | 7/1984 | Ven der Puy | 71/28 |
| 4,488,908 | 12/1984 | Goodwin et al. | 106/75 |
| 4,494,481 | 1/1985 | Rodriguez et al. | |
| 4,571,389 | 2/1986 | Goodwin et al. | 106/75 X |
| 4,622,920 | 11/1986 | Goss | 119/173 |
| 4,628,863 | 12/1986 | Eichenauer | 119/1 |
| 4,641,605 | 2/1987 | Gordon | 119/173 |
| 5,005,520 | 4/1991 | Michael | 119/171 X |

FOREIGN PATENT DOCUMENTS 7505538 of 0000 Japan.

OTHER PUBLICATIONS

Kirk-Othmer, Encyclopedia of Chemical Technology, 3rd Ed., vol. 4, pp. 67-109 (1978).
J. M. Brenner et al., "Urease Activities in Soils", in: Soil Enzymes, p. 181 (1978).
Cotton et al., Advanced Organic Chemistry, 4th Ed., pp. 269-299 (1980).

Primary Examiner—Robert P. Swiatek
Attorney, Agent, or Firm—Joel J. Hayashida; Michael J. Mazza; Harry A. Pacini

[57] ABSTRACT

This invention relates to an clay-based animal litter to which has been applied a liquid carrier containing a boron-containing compound in an odor-controlling effective amount. The boron-containing compound acts by antimicrobial action, controlling urease, or a combination of these mechanisms when the litter is used by the animal. A preferred embodiment of the invention provides a litter to which is added a mixture of boric acid and borax via an aqueous dispersion, with an alkali metal hydroxide as the dispersing agent.

22 Claims, 1 Drawing Sheet

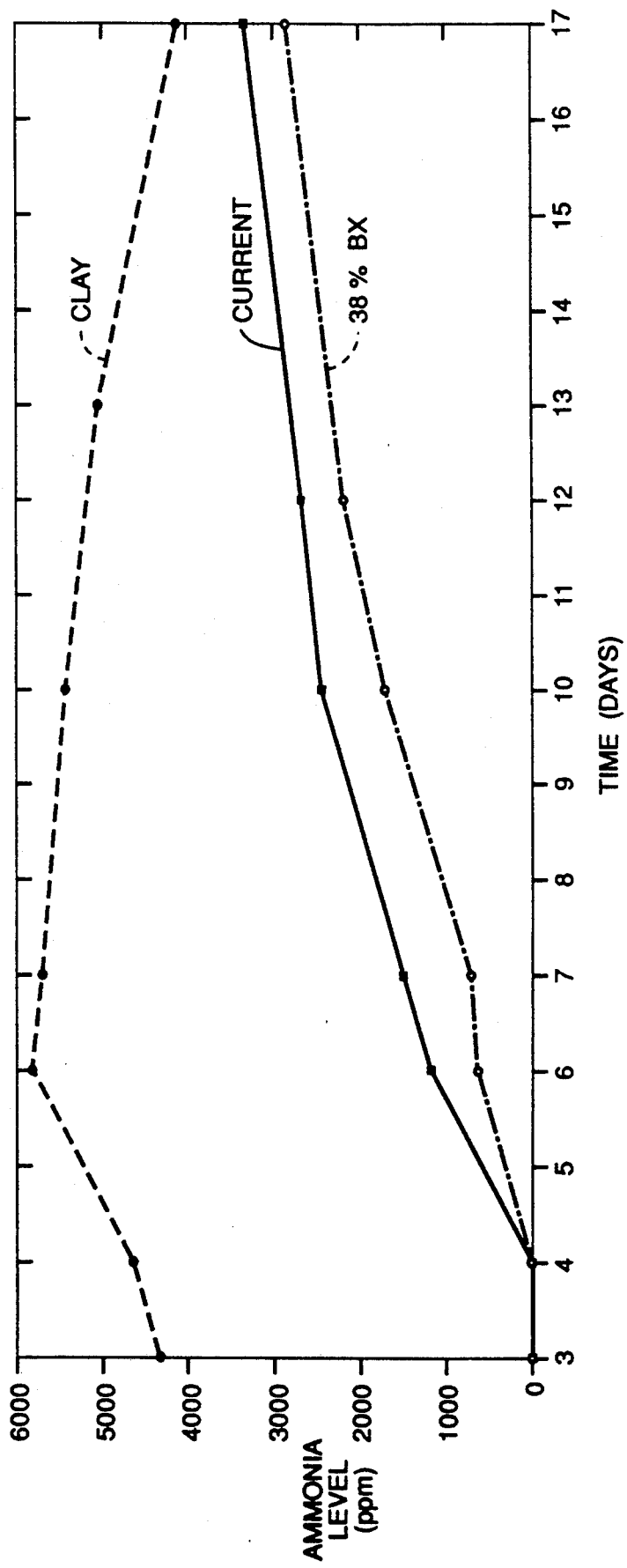
FIG._1

BORON-BASED ODOR CONTROL ANIMAL LITTER

This is a continuation-in-part of Ser. No. 07/208,953, filed Jun. 17, 1988, now U.S. Pat. No. 4,949,672, the specification of which is incorporated herein by reference thereto.

BACKGROUND OF THE INVENTION

1. Field of the Invention

This invention relates to an animal litter to which has been applied an odor-inhibiting agent which is believed to act by antimicrobial action, acidity, controlling urease, or a combination of these mechanisms to control odor after the litter is used by the animal. The preferred odor control animal litter is a clay-based, particulate substrate to which has been applied a liquid carrier containing a boron-containing material at a critical level of at least 0.06% equivalent boron. A preferred boron material is a mixture of boric acid and borax.

2. Brief Description of the Prior Art

Because of the growing number of domestic animals used as house pets, there is a need for litters so that animals may micturate, void or otherwise eliminate liquid or solid waste indoors in a controlled location. However, inevitably, waste build-up leads to malodor production.

As one solution to this problem, Eichenauer, U.S. Pat. No. 4,628,863 suggests a disposable cat litter box which is easily collapsible and can be disposed of in a very compact form. However, this approach, intended for consumer convenience, does not overcome the problem of malodor production.

Kuceski et al, U.S. Pat. No. 3,059,6115, Sawyer et al, U.S. Pat. No. 3,029,783, Currey, U.S. Pat. No. 4,306,516 and Wortham, U.S. Pat. No. 3,892,846, all suggest the use of fairly strong inorganic or organic acids to treat litters in an effort to control ammonia formation in litters. In each instance, it appears that these acids are essentially used to neutralize ammonia to form an odorless salt, e.g., sulfuric acid combining with ammonia to produce ammonium sulfate.

Still others have sought to decrease odors in litters by improving the absorption rate of the litter itself, e.g., Fry et al, U.S. Pat. No. 3,923,005. Yet another attempt to overcome the problem of odor formation is Colborn et al, U.S. Pat. No. 4,407,231, which, unlike other prior art attempts which merely used a superficial treatment of fragrance, teaches pressure-sensitive encapsulated fragrance particles which frangibilize with the weight of the animal.

Also, two references disclose deodorization of sewage by direct, topical application of, respectively, a trichloroisocyanuric acid (Gould, U.S. Pat. No. 4,054,518) and alkylbenzene sulfonic acid (Ohtsuka, Japan Pat. 75-05,538), in both of which cases boric acid is included as a additive in relatively small amounts. Gould apparently uses boric acid as a dispersing agent for the trichloroisocyanuric acid. Ohtsuka, on the other hand, uses the alkylbenzene-sulfonic acid for its emulsifying and foaming properties. Also, Clark et al, U.S. Pat. No. 3,352,792, discloses a deodorant for animal litter containing a dry mixture of magnesium carbonate and borax.

Further, Christianson, U.S. Pat. No. 4,263,873, discloses cellulose pellets impregnated with a pheromone to induce animals to micturate or void in the litter which has a preferred pH of 4-4.5. Christianson further suggests, but does not exemplify, the use of boric acid or borax as odor control materials.

However, none of the foregoing art teaches, discloses or suggests the use of a clay-based litter which has been treated with a urease inhibition/odor control agent comprising a liquid carrier containing a boron-based material at a critical equivalent boron level of at least 0.06%.

SUMMARY OF THE INVENTION

The invention provides an odor control animal litter comprising comminuted clay particles as an absorbent litter substrate, said particles being contacted with a liquid carrier containing an odor-controlling-effective amount of a boron-based material at a critical equivalent boron level of at least 0.06%. It is particularly preferred to use, as the boron-containing material, a mixture of boric acid and borax, and, as a liquid carrier, a solution containing an alkali metal hydroxide.

The odor control animal litter can further include adjuncts selected from dyes, further (and different) antimicrobial agents, deodorants, fragrances, pigments, dedusting compounds, and mixtures thereof. It has further been surprisingly found that a sodium hydroxide solution acting as the carrier material to deliver preferred quantities of the boron-based material into the clay litter substrate will maximize active boron content of the boron-containing material.

BRIEF DESCRIPTION OF THE DRAWING

FIG. 1 is a graphical depiction of a mixture of boric acid:borax compared against a control, the comparison measured in ppm $NH_3$ generated versus time.

DETAILED DESCRIPTION OF THE PREFERRED EMBODIMENTS

The present invention provides an odor control animal litter in which ammonia formation due to decomposition of urea present in animal waste may be affected by one or more of three mechanisms: (1) pH Control. Since ammonia is a basic material, one would expect that maintaining a low pH will result in the formation of salts of ammonia, which are generally odorless. However, in this invention, it has surprisingly been found that pH is a relatively unimportant factor in controlling odor formation. (2) Urease Inhibition. Urease is an enzyme which is produced by many bacteria and other microflora. Urease acts as a catalyst to break down urea into ammonia via the following chemical pathway

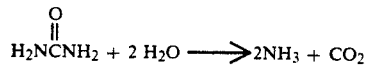

$$H_2NCNH_2 + 2 H_2O \longrightarrow 2NH_3 + CO_2$$

Control of urease, via competition, denaturation, or enzyme poisoning, would therefore significantly reduce the formation of ammonia. (3) Bacterial Inhibition. As previously discussed, bacteria and other microflora appear to be sources for urease. Thus, reduction of bacteria through antimicrobial action of the odor control agents would also significantly control odor formation.

It has been surprisingly discovered that a dramatic reduction in odor formation in used litter can occur if the comminuted clay particles used as the litter base are first contacted with a liquid carrier containing an odorcontrolling-effective amount of a boron-based material at a critical active boron level.

1. Boron-Based Odor Control Agent:

The first of the preferred odor control animal litter additives is boric acid. See, *Kirk Othmer, Enyclopedia Chemical Technology*, 3rd Ed., Vol. 4, pp. 71–77 (1978), incorporated herein by reference. Boric acid has the structure $H_3BO_3$. Boric acid appears to provide multiple benefits in odor control by: (1) acting as a urease inhibitor, which controls odors by preventing enzymatic breakdown of urea; (2) apparently having bacteriostatic properties, which appear to help control odor by controlling the growth of bacteria which are responsible for production of the urease enzymes; and (3) possibly, lowering the pH of the litter thereby neutralizing basic material such as ammonia and amines of animal waste products; However, as previously cautioned, applicants have surprisingly found that in this particular invention, the role of acidity is surprisingly unimportant. Boric acid is available from such suppliers as Kerr-McGee Corporation.

Borax ($Na_2B_4O_7 \times nH_2O$, where n=4,5 or 10) is the second preferred compound for use in the invention. Other boron-based compounds potentially suitable for use are disclosed in *Kirk-Othmer*, supra, pp.67–109, said pages being incorporated herein by reference. In fact, as further discussed below, it appears that the active boron material in the preferred embodiment of this invention is actually polyborate, which can be formed in situ as a result of applying a liquid carrier containing boric acid/borax to a substrate; or it could be separately manufactured, dried, and used. Borax can be obtained from such vendors as U.S. Borax.

It has been found that it is especially preferred to combine boric acid and borax in the invention, in the presence of a liquid carrier containing an alkali metal hydroxide. It has been found that these boron-containing materials can be used in an equivalent ratio of 1:10 to 10:1, most preferably between 1:3 to 3:1. Although boric acid has been found to be an effective-odor controlling material, as shown in the parent application, Ser. No. 07/208,953 (filed Jun. 17, 1988), now U.S. Pat. No. 4,949,672, the substitution of at least a portion of the boric acid with borax has been found to be at least as effective as boric acid alone as the odor control additive. Moreover, the use of borax is advantageous due to cost savings and ease of solubility.

A reference, J. M. Brenner and R. L. Mulvaney, "Urease Activities in Soils," in: *Soil Enzymes* (R. G. Burns, Ed.), p. 181 (1978), discloses that various compounds can act as inhibitors of urea hydrolysis in soils. This urea hydrolysis occurs because of the presence of urease-producing microorganisms. However, the reference does not disclose, teach or suggest that compounds used as urease inhibitors in soils, e.g., by application to fertilizers, would be useful in animal litters. For instance, one reference mentioned, Sor et al, U.S. Pat. No. 3,565,599, discloses that urea fertilizers are coated with a combination of a boron compound and a hydrophobic chemical. It is apparent that the hydrophobic chemical is there to present a barrier to reaction in a moist environment. This can be seen by reviewing Example 8-Table XII, Column 9, Lines 35–52 of the patent.

Another reference, Geissler et al, U.S. Pat. No. 3,523,018 discloses the use of borax as a urease inhibitor in a melt of urea and borax, which must be prilled or pelletized. Finally, Van der Puy et al, U.S. Pat. No. 4,462,819 discloses the use of an organo-boron acid compound as a urease inhibitor for a fertilizer. Again, none of these references teach, disclose or suggest the use of a liquid carrier containing boric acid as an odor control additive for a clay-based animal litter.

Lastly, Christianson, U.S. Pat. No. 4,263,873, discloses cellulose pellets impregnated with a pheromone to induce animals to micturate or void in the litter which has a preferred pH of 4–4.5. Christianson further suggests, but does not exemplify, the use of a boric acid/borax mixture as odor control materials. Most importantly, Christianson neither teaches, discloses or suggests that there is a critical level of at least 0.06% or greater equivalent boron necessary for proper odor control on a clay substrate; that a clay substrate is surprisingly superior to cellulose; and that certain liquid carriers are surprisingly effective at delivering effective amounts of boron compounds onto the clay substrate.

An odor controlling effective amount is defined as at least about 0.06% equivalent boron, more preferably at least greater than 0.06%. The preferred range varies from about 0.06 to about 50%, by weight of the composition. It is more specially preferred that 0.1 to 25%, and most preferably, about 0.1 to 10%, by weight of the composition be used. Assuming the critical level is attained, those skilled in the art will adjust the compositional levels to ensure effective odor control and cost effectiveness.

In the following discussion, equivalent boron is defined as the amount of atomic boron delivered in wt. %. Equivalent boron is determined by calculating the amount of atomic boron in a boron-containing compound, and comparing it to another boron containing compound. e.g., assuming 1 g boric acid and 1 g borax, equivalent boron is:

$$1 \text{ g boric acid}^1 \left( \frac{10.81 \text{ g } B^2}{61.84 \text{ g boric acid}} \right) = 0.1748 \text{ g equiv. boron}$$

$$1 \text{ g borax}^3 \left( \frac{43.24 \text{ g } B^2}{381.37 \text{ g borax}} \right) = 0.1134 \text{ g equiv. boron}$$

$$\frac{0.1134}{0.1748} \times 100\% = 64.87\%$$

[1] Molecular weight of boric acid ($H_3BO_3$) is 61.84
[2] Atomic weight of boron is 10.81. In boric acid, there is only one atom of boron; in borax, there are four.
[3] Molecular weight of borax ($Na_2B_4O_7 \times 10H_2O$) is 381.37, assuming borax decahydrate.

Thus, decahydrate borax has 64.87% of the amount of equivalent boron compared to 1 g boric acid. Pentahydrate and tetrahydrate borax, on the other hand, are calculated in a similar manner with different equivalent boron measures.

The borax and boric acid are powdered or comminuted solids, and are combined with a liquid carrier such as water or water and a solvent, emulsifier or a hydrotrope, if necessary. It is most preferred to add the additive via liquid carrier to evenly distribute the additive to the litter material. As discussed below, the most preferred manner of addition is to use an alkali metal hydroxide solution as a carrier.

2. Litter materials:

A wide variety of materials can be used for litters. For example, porous clays are readily adaptable for use as the absorbent substrates needed for litters. Their ability to absorb or adsorb moisture makes them excellent candidates for litters. Most importantly, in the invention, clays demonstrate superior odor control properties when dosed with boron-containing compounds. Suitable litters include Georgia White clay, attapulgite, bentonite, montmorillonite, fossilized plant materials, expanded perlites, zeolites, gypsum and other equivalent materials known to those skilled in the art. Paper or other cellulose based materials are not preferred. The clay particles are comminuted. That is, they are pelletized or formed into particles which have a size varying from 50 to 5600 microns, although such particle size does not appear critical to the practice of the invention. A particularly preferred litter is the litter containing a microencapsulated fragrance described in Colborn et al, U.S. Pat. No. 4,407,231, incorporated herein by reference.

3. Adjunct materials:

Suitable adjuncts can be added to the litters of this invention. For instance, there are dyes and pigments such as suitably treated titanium dioxide; additional and different germicides such as quaternary ammonium compounds, and certain 3-isothiazolones (sold under the trademark KATHON®); chemical deodorants, such as sodium bicarbonate, which differ from the boron-based compounds of the invention; fragrances (such as those available from such commercial vendors as International Flavours and Fragrances, Inc. and Givaudan), which fragrances can additionally be uncoated (e.g., fragrance blends) or encapsulated (as in U.S. Pat. No. 4,407,231); dedusting compounds or agents, such as water-soluble polymeric resins, e.g., polyvinyl alcohol, polyvinyl pyrrolidone, polyacrylic acid, xanthan gum, gum arabic, other natural resins, and mixtures of any of these resins.

4. Processing Materials:

It has been further surprisingly found that in order to maximize the amount of equivalent boron which can be applied to the litter substrate, sodium hydroxide (NaOH) in aqueous solution is used as a carrier material. Other alkali metal hydroxides may also be preferred.

The present invention represents an alternative to the invention of the parent application Ser. No. 07/208,953 (filed Jun. 17, 1988). In that application, it was discovered that a relatively large amount of alkali metal hydroxide, preferably sodium hydroxide, was necessary to disperse/solubilize boric acid in order to maximize the boron content of the solution to be applied to the litter.

By contrast, the present invention substitutes a portion of boric acid utilized in the parent application with borax, for cost and processing reasons. It was surprisingly found that in this invention, the amount of alkali metal hydroxide used must be carefully monitored and restricted. Unlike the parent, much *lower* amounts of hydroxide are used. Although the parent demonstrated that the *resulting* pH of the finished litter product was not important to predict the odor control properties of such litter, it has now been ascertained that the pH of the liquid containing the boron materials and hydroxide is important. The pH of this liquid determines the solubility of the boron materials therein. Therefore, it has been found that the liquid's pH should be close to neutral.

Therefore, it has been found that the pH of the liquid carrying the boron materials should be about 6.0 to 9.0, more preferably about 6.0 to 8.0 and most preferably, about 6.5 to 7.5. In order to accomplish this critical pH limitation, in the present invention, the range of sodium hydroxide solution (assuming 50% solution) can vary from a range up to 1.0 wt. %, and it is preferred that it be present in certain weight ratios with respect to the boric acid/borax mixture. Preferably, boric acid/borax to NaOH ratio is less than about 19:1, more preferably less than about 49:1. The resulting pH of the litter is close to that of the solution's, although typically somewhat more alkaline.

5. Coated Litter Embodiment:

In a preferred embodiment of this invention, the litter is coated via a semi-continuous spray-coating process with numerous materials, including the boron-based odor control actives.

It is most desirable to combine various materials, such as a fragrance, and contact the same to the clay litters of this invention. Microencapsulated fragrances provide a means of aesthetically fragrancing and masking odors. The microcapsules accomplish this by fracturing when the animal steps on the litter and stresses the microcapsules until they rupture, releasing the fragrance. Similarly, by having the boron-containing odor control compounds of this invention in close association with the litter particles, one avoids underdosing some particles, and having excess odor control agent on others, thus underutilizing the agent.

Thus, in a preferred embodiment, the boron-containing materials of this invention are processed in a solution containing alkali metal hydroxide, which could contain other actives, most desirably, at least one further additive selected from dyes, pigments, fragrances (most preferably, encapsulated fragrance), further odor control/antimicrobial agents, chemical deodorants, emulsifiers, thickeners and adhesive agents, and dedusting agents. However, certain actives may more desirably be added in separate stages. For example, encapsulated fragrances may be added in a separate stage in order to minimize processing which could burst the encapsules. Also, certain other additives could volatilize under agitation, so addition at a later stage may also be desirable.

Xanthan gum is preferred herein, since it appears to perform many functions, such as suspending, thickening and adhering. It is a natural resin, available from many suppliers, such as Kelco and Pfizer.

In the following experimental section, a boric acid/borax formulation is prepared and its performance compared against a comparison formulation and an untreated clay substrate. The inventive litter demonstrated surprisingly good odor control performance.

I. Boric Acid/Borax Execution

In the following experiment, a comparison was made among the preferred boric acid/borax mixture, a current boric acid formulation, and a clay litter control (containing no odor control agent).

In this experiment, the following formulations were compared:

TABLE I

| Ingredient | Invention[1] (Boric Acid/ Borax) | Comparison[1] (Boric Acid) | Control (Clay Substrate) |
|---|---|---|---|
| Clay | 96.85 | 96.85 | 100.0 |
| Slurry | 3.00 (#1) | 3.00 (#2) | — |
| Misc. Addtv. | 0.15 | 0.15 | — |

[1]The slurries #1 and #2 were composed as follows: the boron compounds and the NaOH are combined into respective solution, and the then added as 3 wt. % of the litter formulation by spraying onto the surface of the clay particles.

| | Slurry 1 | Slurry 2 |
|---|---|---|
| Boric Acid | 11.59 | 18.48 |

TABLE I-continued

| Ingredient | Invention[1] (Boric Acid/ Borax) | Comparison[1] (Boric Acid) | Control (Clay Substrate) |
|---|---|---|---|
| Borax | 8.11 | — | |
| NaOH | 0.39 | 3.0 | |
| Xanthan Gum | 0.25 | 0.25 | |
| Water | 76.57 | 75.18 | |
| Misc. Add. | 3.09 | 3.09 | |
| | 100.00 | 100.00 | |

The litter formulations were then split into 50 g portions, poured into 8 oz. jars and treated with 50 ml cat urine. These jar samples were then stored at room temperature (21° C.) and measured for ammonia ($NH_3$) generation using a Kitegawa toxic gas detector with Matheson ammonia detector tubes.

The following results were obtained:

TABLE VI

| | | ($NH_3$ levels in ppm) | | |
|---|---|---|---|---|
| Day | Sample | Invention | Comparison | Control |
| 3 | 1 | 1.0 | 0.0 | 4500.0 |
| | 2 | 2.0 | 0.0 | 4500.0 |
| | 3 | 0.0 | 0.0 | 4500.0 |
| | 4 | 0.0 | 0.0 | 4500.0 |
| | 5 | 0.0 | 0.0 | 4000.0 |
| | Avg. | 0.6 | 0.0 | 4400.0 |
| 4 | 1 | 0.0 | 35.0 | 4000.0 |
| | 2 | 5.0 | 15.0 | 4500.0 |
| | 3 | 0.0 | 40.0 | 4500.0 |
| | 4 | 0.0 | 60.0 | 5000.0 |
| | 5 | 0.0 | 60.0 | 5000.0 |
| | Avg. | 1.0 | 42.0 | 4600.0 |
| 6 | 1 | 300.0 | 1150.0 | 6000.0 |
| | 2 | 500.0 | 850.0 | 6000.0 |
| | 3 | 700.0 | 1200.0 | 5500.0 |
| | 4 | 900.0 | 1300.0 | 6000.0 |
| | 5 | 750.0 | 1250.0 | 6000.0 |
| | Avg. | 630.0 | 1150.0 | 5900.0 |
| 7 | 1 | 500.0 | 2000.0 | 6000.0 |
| | 2 | 500.0 | 1500.0 | 5500.0 |
| | 3 | 500.0 | 1000.0 | 6000.0 |
| | 4 | 1000.0 | 1500.0 | 5500.0 |
| | 5 | 1000.0 | 1500.0 | 5500.0 |
| | Avg. | 700.0 | 1500.0 | 5800.0 |
| 10 | 1 | 1000.0 | 3000.0 | 6000.0 |
| | 2 | 1000.0 | 2000.0 | 4500.0 |
| | 3 | 2000.0 | 2500.0 | 6000.0 |
| | 4 | 2000.0 | 2500.0 | 6000.0 |
| | 5 | 2500.0 | 2000.0 | 5000.0 |
| | Avg. | 1700.0 | 2400.0 | 5500.0 |
| 12 | 1 | 2400.0 | 3400.0 | 4800.0 |
| | 2 | 1400.0 | 2400.0 | 5900.0 |
| | 3 | 2600.0 | 2200.0 | 6000.0 |
| | 4 | 2400.0 | 2800.0 | 5000.0 |
| | 5 | 2000.0 | 2400.0 | 5000.0 |
| | Avg. | 2160.0 | 2640.0 | 5340.0 |
| 17 | 1 | 2000.0 | 3500.0 | 4500.0 |
| | 2 | 3500.0 | 3000.0 | 3500.0 |
| | 3 | 2500.0 | 3000.0 | 4000.0 |
| | 4 | 3500.0 | 3000.0 | 4000.0 |
| | 5 | 2500.0 | 4000.0 | 4000.0 |
| | Avg. | 2800.0 | 3300.0 | 4000.0 |

These results were also plotted graphically in FIG. 1. As can be seen from reviewing these data, a boric acid/borax mixture is an especially preferred execution of the invention. While performance of this version is quite good, the low cost of borax and the ease of processing this embodiment of the invention are particularly favorable.

While the foregoing formulations depict various embodiments of the invention, such examples are non-limiting and do not restrict the scope and content of the claimed invention. The invention is further illustrated by reference to the claims which follow hereto.

What is claimed is:

1. An odor control animal litter comprising:
particles of an absorbent clay substrate, said particles being contacted with a liquid carrier containing an odor-controlling-effective amount of a mixture of boric acid and borax having an equivalent boron level of at least 0.06% and said mixture being present in an amount of from about 0.06 to about 50% by weight, said liquid carrier comprising an alkali metal hydroxide in solution.

2. The odor control animal litter of claim 1 wherein the absorbent substrate is a clay selected from Georgia White clay, attapulgite, bentonite, montmorillonite, expanded perlites, zeolites and gypsum.

3. The odor control animal litter of claim 1 wherein said metal hydroxide is sodium hydroxide.

4. The odor control animal litter of claim 3 wherein the amount of sodium hydroxide in solution is less than 1%.

5. The odor control animal litter of claim 1 wherein the ratio of boric acid:borax varies from about 1:10 to 10:1.

6. The odor control animal litter of claim 1 wherein the ratio of boric acid:borax varies from about 1:3 to 3:1.

7. The odor control animal litter of claim 1 further comprising an adjunct selected from dyes, further germicides, chemical deodorants, fragrances, pigments, dedusting compounds, adhesives, thickening agents, suspending agents, and mixtures thereof.

8. The odor control animal litter of claim 7 wherein said fragrance is selected from non-coated and encapsulated fragrances.

9. The odor control animal litter of claim 7 further comprising a suspending and adhesive agent.

10. The odor control animal litter of claim 9 wherein said suspending and adhesive agent is a natural resin.

11. The odor control animal litter of claim 10 wherein said natural resin is xanthan gum.

12. A method of controlling odor formation in animal litters when said litters are used by animals, comprising applying to particles of an absorbent litter substrate a liquid carrier containing an odor-controlling-effective amount of a mixture of boric acid and borax having an equivalent boron level of at least about 0.06% and said mixture being present in an amount of from 0.06 to about 50% by weight, said liquid carrier further comprising an alkali metal hydroxide in solution.

13. The method of claim 12 wherein the ratio of boric acid:borax varies from about 1:10 to 10:1.

14. The method of claim 12 wherein the ratio of boric acid:borax varies from about 1:3 to 3:1.

15. The method of claim 12 wherein said alkali metal hydroxide is sodium hydroxide.

16. The method of claim 15 wherein the amount of sodium hydroxide in solution is less than about 1.0%.

17. The method of claim 12 further comprising the step of adding an adjunct selected from dyes, further germicides, chemical deodorants, fragrances, pigments, dedusting compounds, adhesives, thickening agents, suspending agents and mixtures thereof.

18. The method of claim 17 further comprising adding a suspending and adhesive agent.

19. The method of claim 18 wherein said suspending and adhesive agent is a natural resin.

20. The method of claim 19 wherein said natural resin is xanthan gum.

21. The method claim 12 carried out as a batch process.

22. The method of claim 12 carried out as a continuous process.

* * * * *